Aug. 7, 1928. Re. 17,060

R. T. WOODARD

CEMENT MANTEL

Original Filed May 26, 1924

Inventor
R. T. Woodard,

By Clarence O'Brien
Attorney

Reissued Aug. 7, 1928. Re. 17,060

UNITED STATES PATENT OFFICE.

RUFUS T. WOODARD, OF OAKLAND, CALIFORNIA.

CEMENT MANTEL.

Original No. 1,527,723, dated February 24, 1925, Serial No. 716,024, filed May 26, 1924. Application for reissue filed September 9, 1926. Serial No. 134,381.

This invention relates to cement mantels especially adapted to be used as fire places and it consists in the novel features hereinafter described and claimed.

It has been heretofore difficult to construct a mantel of cement and in one piece which would withstand the heat and stress to which it is subjected in use without checking, cracking or otherwise disintegrating.

This invention is designed to overcome the above defects and to provide a one-piece cement mantel adapted to be made in any shape and size for use in fire places or imitation fire places where gas and electric heaters are employed, which will effectively support the wall above where necessary, and is so constructed that the heat will be equally distributed over the mantel to reduce or substantially eliminate the tendency to disintegrate.

The invention also comprehends a one-piece cement mantel construction in which a main body is provided with laterally extending flanges around the edge portions having a uniform section throughout, and in which the flanges cooperate with the body to provide a heating chamber on the rear side so that the entire structure will be heated and will cool in a substantially uniform manner in order to eliminate cracking or other disintegration caused by the heat in constructions heretofore used.

An object of the invention is to provide a cement mantel reinforced with steel bars to prevent cracking, the mantel having the bars embedded therein thereby forming a single piece structure and being a single unit is independent of the chimney to which it is applied, consequently any settling or cracking of the chimney will not distort or fracture the mantel.

A further object of the invention is to provide a mantel of the character stated which is easy to install, inexpensive to manufacture, and which may be readily shipped, handled or moved at small cost.

Figure 1:
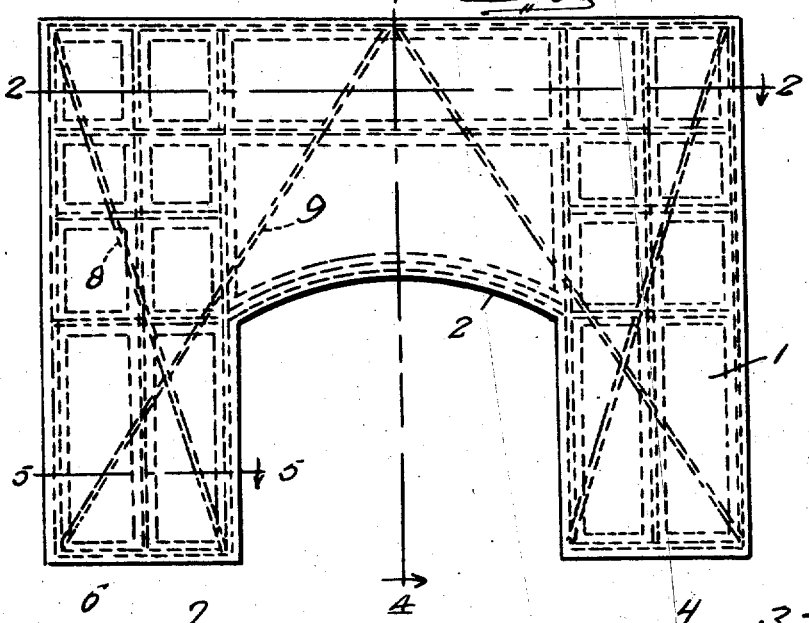
Figure 1 is a front elevational view of the mantel.
Figure 3:
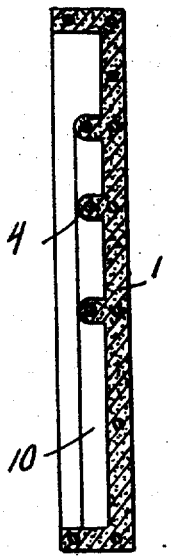
Fig. 3 is a vertical sectional view thereof cut on the line 3—3 of Fig. 1.
Figure 2:
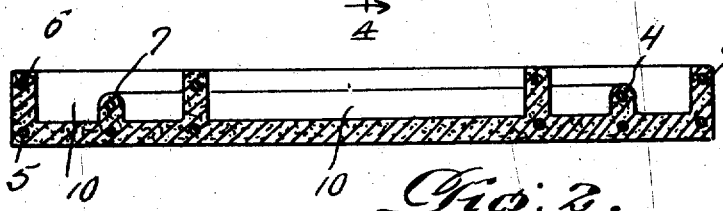
Fig. 2 is a horizontal sectional view thereof cut on the line 2—2 of Fig. 1.
Figure 4:
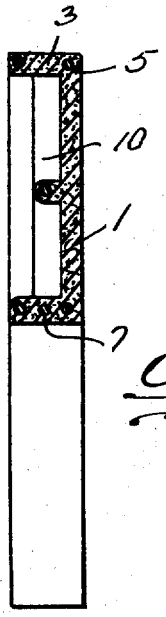
Fig. 4 is a vertical sectional view thereof cut on the line 4—4 of Fig. 1.
Figure 5:
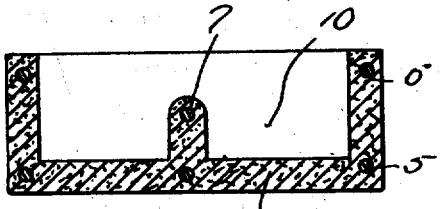
Fig. 5 is a vertical sectional view thereof cut on the line 5—5 of Fig. 1.

The mantel comprises a substantially rectangular panel 1 composed of concrete cement and provided at its lower portion and between its vertical sides with an arch opening 2. The panel 1 is provided around its edges with a continuous flange 3 and intermediate said flange 3 with ribs 4. The flange 3 and ribs 4 are also of concrete cement and integral with the panel. Steel bars 5 are embedded in the panel 1, steel bars 6 are embedded in the flange 3 and disposed parallel with the bars 5, and steel bars 7 are embedded in the ribs 4 and are disposed parallel with certain of the bars 5.

Certain of the bars 5 and 6 extend along the vertical edges and over the top of the arch opening 2 and strengthen the structure of the panel about said arch opening. Diagonally disposed bars 8 are embedded in the panel 1 and extend from the upper corners thereof toward the lower ends at the sides of the opening 2. Diagonally disposed bars 9 are embedded in the panel 1 and extend from the lower corners thereof to the upper intermediate portion terminating at the upper edge of the panel in adjacent relation.

The bars 8 and 9 strengthen the corner portions of the panel 1 and also strengthen the structure at the angles or corners of the arch opening 2 and further serves to distribute stresses over the arched opening laterally in opposed direction to the lower outer corner portions. The panel 1 may be provided with an ornamental face lythic, or stipple and applied to wet or dry concrete with a trowel or dashed on the outer surface with a brush to mingle and blend colors in imitation of stone or terra cotta.

The flange 3 extending entirely around the edge portion of the mantel provides a continuous air space in the back of the main body of the mantel in order that heat from a fire within the arch portion 2 will be more equally distributed over the entire surface so that it will be heated more uniformly which has been found to substantially eliminate checking or cracking due to unequal expansion or contraction in different portions of the structure. In this way the flanges 3 cooperate with the main body 1 of the mantel to obtain a special result in the construction and operation of the mantel. In addition this flange structure permits the construction of a mantel which may be applied against a wall where no chimney is used so that an imitation fire place may be readily provided in which the recessed portion having the arch 2 will receive gas logs or electric heating means adapted to provide the artificial fire.

In a construction of this character, the air space formed in the rear of the portion 1, of the mantel by the flanges 3 cooperating therewith, will serve to more equally distribute the heat to all portions of the structure for the purposes above set forth.

Where the mantel construction of this invention is used with a chimney it has been found that the structure in addition to providing the air space for equalizing heat distribution is adapted to effectively seal the opening in the fire place in such a manner that it will provide a smokeless bridge portion over the fire place so that no smoke will be blown or drawn outwardly into the room in the normal operation thereof.

The invention further comprehends the provision of a structure wherein the portions at each side of the mantel provided with the projections 4 thereon cooperate with the projections 3 and 4 on the rear face of the mantel so as to properly distribute stresses applied in placing the mantel under a building wall for partially supporting the same from the center to the outside edge portions, so as to prevent the tendency of the mantel to crack over the arched opening due to such weight.

Having thus described my invention, what I claim as new is:—

1. A cement mantel of a predetermined formation provided at its lower portion and between its side edges with a fire place opening, a flange surrounding the edges of the mantel, and ribs disposed along the interior surface of the mantel of a depth shorter than the flanges whereby to permit free circulation of air at the rear surface of the mantel within the space defined by the flanges.

2. A cement mantel of a predetermined formation having at its lower portion and between its side edges a fire place opening, the panel being provided at its rear side with a continuous flange which extends around the edges of the panel and the arch opening therein, the panel having at its rear side transversely disposed ribs, bars embedded in the panel and the flange and ribs, bars embedded in the panel and extending diagonally from the upper corners thereof to the lower corners of the opening and other bars embedded in the panels and extending from the lower corners thereof to a point above the fire place opening and midway between the side edges of the panel.

3. A mantel comprising a flat body of predetermined form having a fire place opening formed in the bottom side portion thereof, a plurality of bars embedded in the edge portion of said body and other bars embedded in said body and extending diagonally from the lower corner to the upper portion thereof for reinforcing the edge portions and the central portions of said body over said fire place opening, and a flange formed at a uniform depth about the edges of the inner face of the body adapted to space the same outwardly from the wall structure and providing an air space at the rear of the body, in which the air may freely circulate within the confines of the flanges.

4. A reinforced cement mantel comprising a panel having a fireplace opening formed in its lower portion and provided at its rear side with a flange extending continuously about its edges including the edges of the opening, a plurality of ribs formed on the rear side of the panel and of a depth shorter than said flanges whereby to provide a reinforcing means for the panel without interfering with the free circulation of air at the rear of the panel in the space defined by the flanges, said ribs being disposed parallel with the flanges at opposite edges and communicating with the flanges of the remaining edges, bars embedded in the panel and the flange and the ribs, bars embedded in the panel and extending diagonally from the upper corners thereof to the lower corners of the opening, and other bars embedded in the panel and extending from the lower corners thereof to a point above the fire place opening, and midway between the side edges of the panel.

5. A reinforced cement mantel comprising a panel having a fireplace opening formed in its lower portion and provided in its rear side with a flange extending continuously about its edges including the edges of the opening, a plurality of vertically and horizontally disposed ribs formed on the rear side of the panel, said vertical ribs being arranged in spaced parallel relation from the flanges at each side of the panel and communicating with the flanges at the upper and lower edges and said horizontal ribs being arranged in spaced parallel relation with the upper and lower flanges and communicating with the side flanges, said ribs intersecting each other, bars embedded in the panel and the flange and rib, bars embedded in the panel and extending diagonally from the upper corners thereof to the lower corners of the openings and other bars embedded in the panels and extending from the lower corners thereof to a point above the fireplace opening and midway between the side edges of the panel.

In testimony whereof I affix my signature.

RUFUS T. WOODARD.